United States Patent
Hwang et al.

(10) Patent No.: US 11,191,016 B2
(45) Date of Patent: Nov. 30, 2021

(54) SERVICE-BASED CELL SELECTION AND RESELECTION CONTROL METHOD

(71) Applicant: Samsung Electronics Co., Ltd, Suwon-si (KR)

(72) Inventors: Jiwon Hwang, Suwon-si (KR); Jungsoo Jung, Seongnam-si (KR); Sunheui Ryoo, Yongin-si (KR); Jungmin Moon, Suwon-si (KR); Rayeon Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/324,860

(22) PCT Filed: Aug. 11, 2017

(86) PCT No.: PCT/KR2017/008805
§ 371 (c)(1),
(2) Date: Feb. 11, 2019

(87) PCT Pub. No.: WO2018/030867
PCT Pub. Date: Feb. 15, 2018

(65) Prior Publication Data
US 2019/0174406 A1    Jun. 6, 2019

Related U.S. Application Data

(60) Provisional application No. 62/373,948, filed on Aug. 11, 2016.

(51) Int. Cl.
*H04W 56/00* (2009.01)
*H04W 48/20* (2009.01)
(Continued)

(52) U.S. Cl.
CPC .......... *H04W 48/20* (2013.01); *H04B 17/318* (2015.01); *H04W 36/0066* (2013.01);
(Continued)

(58) Field of Classification Search
CPC . H04W 48/20; H04W 36/0066; H04W 36/08; H04W 36/30; H04W 48/10; H04W 48/16; H04B 17/318
(Continued)

(56) References Cited

U.S. PATENT DOCUMENTS 9,386,484 B2    7/2016    Jeong et al.
9,432,885 B2    8/2016    Kim et al.
(Continued)

FOREIGN PATENT DOCUMENTS

KR    10-1006251 B1    1/2011
KR    10-2011-0049855 A    5/2011
(Continued)

OTHER PUBLICATIONS

International Search Report dated Nov. 17, 2017 in connection with International Patent Application No. PCT/KR2017/008805, 4 pages.
(Continued)

*Primary Examiner* — Sai Ming Chan

(57) ABSTRACT

The present disclosure relates to a communication technique for converging IoT technology with a 5G communication system for supporting a higher data transfer rate beyond a 4G system, and a system therefor. The present disclosure can be applied to intelligent services (e.g., smart homes, smart buildings, smart cities, smart or connected cars, health care, digital education, retail business, and services associated with security and safety) on the basis of 5G communication technology and IoT-related technology. A communication method of a terminal according to one embodiment of the present invention may comprise the steps of: checking
(Continued)

information on at least one service supported by a terminal; selecting a first frequency band in which a cell search is to be performed; receiving a reference signal from at least one cell at the selected first frequency; selecting, as a target cell, a first cell from which the reference signal having the largest strength has been received; and when the target cell supports the at least one service supported by the terminal, accessing the target cell.

14 Claims, 12 Drawing Sheets

(51) Int. Cl.
　　　*H04W 48/16*　　　(2009.01)
　　　*H04B 17/318*　　　(2015.01)
　　　*H04W 36/00*　　　(2009.01)
　　　*H04W 36/08*　　　(2009.01)
　　　*H04W 36/30*　　　(2009.01)
　　　*H04W 48/10*　　　(2009.01)

(52) U.S. Cl.
　　　CPC .......... *H04W 36/08* (2013.01); *H04W 36/30* (2013.01); *H04W 48/10* (2013.01); *H04W 48/16* (2013.01)

(58) Field of Classification Search
　　　USPC ........................................................ 370/329
　　　See application file for complete search history.

(56) References Cited

U.S. PATENT DOCUMENTS

| | | | | |
|---|---|---|---|---|
| 2009/0156206 A1* | 6/2009 | Rathonyi | ............. | H04W 48/16 455/434 |
| 2010/0029274 A1 | 2/2010 | Deshpande et al. | | |
| 2010/0222055 A1* | 9/2010 | Cho | ...................... | H04W 36/30 455/434 |
| 2013/0272263 A1 | 10/2013 | Pi et al. | | |
| 2014/0161020 A1 | 6/2014 | Jung et al. | | |
| 2015/0181373 A1* | 6/2015 | Xie | ....................... | H04M 15/00 455/406 |
| 2015/0271746 A1 | 9/2015 | Jang et al. | | |
| 2016/0316411 A1 | 10/2016 | Jung et al. | | |
| 2016/0337961 A1* | 11/2016 | Hu | ....................... | H04B 17/318 |
| 2017/0303259 A1* | 10/2017 | Lee | ...................... | H04W 72/048 |
| 2017/0339688 A1* | 11/2017 | Singh | ..................... | H04W 76/11 |
| 2017/0367110 A1* | 12/2017 | Li | ..................... | H04W 74/0816 |
| 2018/0132297 A1* | 5/2018 | Li | ......................... | H04W 72/121 |
| 2018/0176900 A1* | 6/2018 | Rong | .................... | H04W 40/20 |
| 2018/0317148 A1* | 11/2018 | Jin | ......................... | H04W 36/08 |
| 2019/0174449 A1* | 6/2019 | Shan | ...................... | H04W 60/00 |

FOREIGN PATENT DOCUMENTS

| | | |
|---|---|---|
| KR | 10-2013-0019732 A | 2/2013 |
| KR | 10-2014-0136898 A | 12/2014 |
| KR | 10-2015-0109119 A | 10/2015 |
| KR | 10-2016-0075570 A | 6/2016 |
| WO | 2013/154375 A1 | 10/2013 |

OTHER PUBLICATIONS

Written Opinion of the International Searching Authority dated Nov. 17, 2017 in connection with International Patent Application No. PCT/KR2017/008805, 5 pages.

Samsung, "Service Specific Cell (Re-) Selection in NR", 3GPP TSG-RAN WG2 Meeting #94, May 23-27, 2016, R2-163373, 4 pages.

Office Action dated Apr. 27, 2021 in connection with Korean Patent Application No. 10-2017-0102493, 10 pages.

* cited by examiner

SERVICE-BASED CELL SELECTION AND RESELECTION CONTROL METHOD

CROSS-REFERENCE TO RELATED APPLICATIONS

This application is a 371 of International Application No. PCT/KR2017/008805 filed on Aug. 11, 2017, which claims priority to U.S. Patent Application No. 62/373,948 filed on Aug. 11, 2016, the disclosures of which are herein incorporated by reference in their entirety.

BACKGROUND

1. Field

The present invention relates to a cell selection and reselection method for a wireless connection of a terminal in a next generation wireless communication system.

2. Description of Related Art

In order to satisfy the increasing demands of radio data traffic after the commercialization of a 4G communication system, efforts have been made to develop an advanced 5G communication system or a pre-5G communication system. For this reason, the 5G communication system or the pre-5G communication system is also referred to as a beyond-4G network communication system or a post-LTE system.

In order to accomplish a higher data transfer rate, the implementation of the 5G communication system in a super-high frequency (mmWave) band (e.g., about a 60 GHz band) is being considered. Also, in order to obviate a propagation loss of a radio wave and increase a delivery distance of a radio wave in the super-high frequency band, discussions for the 5G communication system are underway about various techniques such as a beamforming, a massive MIMO, a full dimensional MIMO (FD-MIMO), an array antenna, an analog beamforming, and a large scale antenna.

Additionally, for an improvement in network of the 5G communication system, technical developments are being made in an advanced small cell, a cloud radio access network (cloud RAN), an ultra-dense network, a device to device (D2D) communication, a wireless backhaul, a moving network, a cooperative communication, coordinated multi-points (CoMP), a reception-end interference cancellation, and the like. Also, in the 5G communication system, a hybrid FSK and QAM modulation (FQAM) and a sliding window superposition coding (SWSC) are developed as advanced coding modulation (ACM) schemes, and a filter bank multi carrier (FBMC), a non-orthogonal multiple access (NOMA), and a sparse code multiple access (SCMA) are also developed as advanced access techniques.

The 5G system considers supporting various services compared to the existing 4G system. Examples of such services are an enhanced mobile broadband (eMBB) service, an ultra-reliable and low latency communication (URLLC) service, a massive machine type communication (mMTC) service, an evolved multimedia broadcast/multicast service (eMBMS), and the like. A system of providing the URLLC service may be referred to as a URLLC system, and a system of providing the eMBB service may be referred to as an eMBB system. In addition, the terms service and system may be used interchangeably.

The URLLC service is newly considered in the 5G system, unlike the existing 4G system, and requires very high reliability (e.g., packet error rate of about 10-5) and low latency (e.g., about 0.5 msec) compared to other services. In order to satisfy such requirements, the URLLC service may need to apply a transmission time interval (TTI) that is shorter than that of the eMBB service, and various operating methods utilizing this are considered.

The existing 3GPP technology (e.g., LTE) is characterized in that a cell is selected using measured values of signal strength such as reference signal received power (RSRP) and reference signal received quality (RSRQ). When a cell measuring and ranking operation is performed, the frequency priority may be set. The priority may be optionally specified by an operator or network operator as needed.

The LTE-based standard may support the operation of a terminal (or UE) in a radio resource control (RRC) idle mode (or state) and an RRC connected mode by means of a single radio protocol design. Accordingly, when a service having a significantly different quality of service (QoS) or requirement is introduced, the operation of each protocol layer should be newly designed (e.g., a narrow band internet of things (NB-IoT) or enhanced machine type communication (eMTC) standard technology).

However, in a new radio (NR, 5G) according to an embodiment of the present invention, an object is to support various service requirements with one operation design in each protocol layer. It is another object of the present invention to provide a method for a terminal to (re)select a cell in an RRC idle state or an RRC inactive state.

The present invention is not limited to the above objects, and any other object, even though not mentioned herein, may be well understood from the following description by those skilled in the art.

SUMMARY

In order to accomplish the above objects, a communication method of a terminal according to an embodiment of the present invention may comprise identifying service information on at least one service supported by the terminal; selecting a first frequency band for a cell searching; receiving a reference signal from at least one cell in the selected first frequency band; selecting a first cell having a largest strength of the reference signal is received with a largest strength as a target cell; determining whether the target cell supports the at least one service supported by the terminal based on the service information; and accessing the target cell, based on the target cell supporting the at least one service supported by the terminal.

In addition, the method may further comprise selecting a second cell having a larger signal strength after the first cell as the target cell, based on the target cell not supporting the at least one service supported by the terminal.

The method may further comprise selecting a second frequency band in which a cell search is to be performed, based on the target cell not supporting the at least one service supported by the terminal.

In addition, determining whether the target cell supports the at least one service supported by the terminal may include receiving, from the target cell, information on a service supported by the target cell.

In addition, the target cell may include at least one of a cell having a received strength of the reference signal greater than a predetermined first threshold value, a cell having a difference between a received strength of the reference signal and a received strength of a reference signal of the first cell, the difference being smaller than a predetermined second threshold value, a cell supporting at least one service supported by the terminal, or a cell set as a target base station by the base station.

In addition, receiving a reference signal from at least one cell may include selecting a slice in which the cell search is to be performed; and receiving a reference signal from the at least one cell in the slice.

In addition, the slice may be a common slice supporting a plurality of services or a dedicated slice supporting a specific service only.

Further, in order to accomplish the above objects, a terminal according to an embodiment of the present invention may comprise a transceiver configured to identify service information on at least one service supported by the terminal, select a first frequency band for a cell searching, receive a reference signal from at least one cell in the selected first frequency band, select a first cell having a largest strength of the reference signal as a target cell, determine whether the target cell supports the at least one service supported by the terminal based on the service information, and access the target cell, based on the target cell supporting the at least one service supported by the terminal.

According to an embodiment of the present invention, provided are a method and apparatus for performing a cell selection in an RRC idle state in a wireless communication system. Particularly, in a wireless communication system in which a terminal supporting at least one slice (service) and a base station supporting at least one slice (service) are simultaneously present, the terminal defines a cell selection operation and thereby enables resource-effective communication based on a service supported by the terminal.

Effects obtained by the present invention are not limited to the above-mentioned effects, and other effects, even though not mentioned herein, may be well understood from the following description by those skilled in the art.

DETAILED DESCRIPTION

Figure 1:
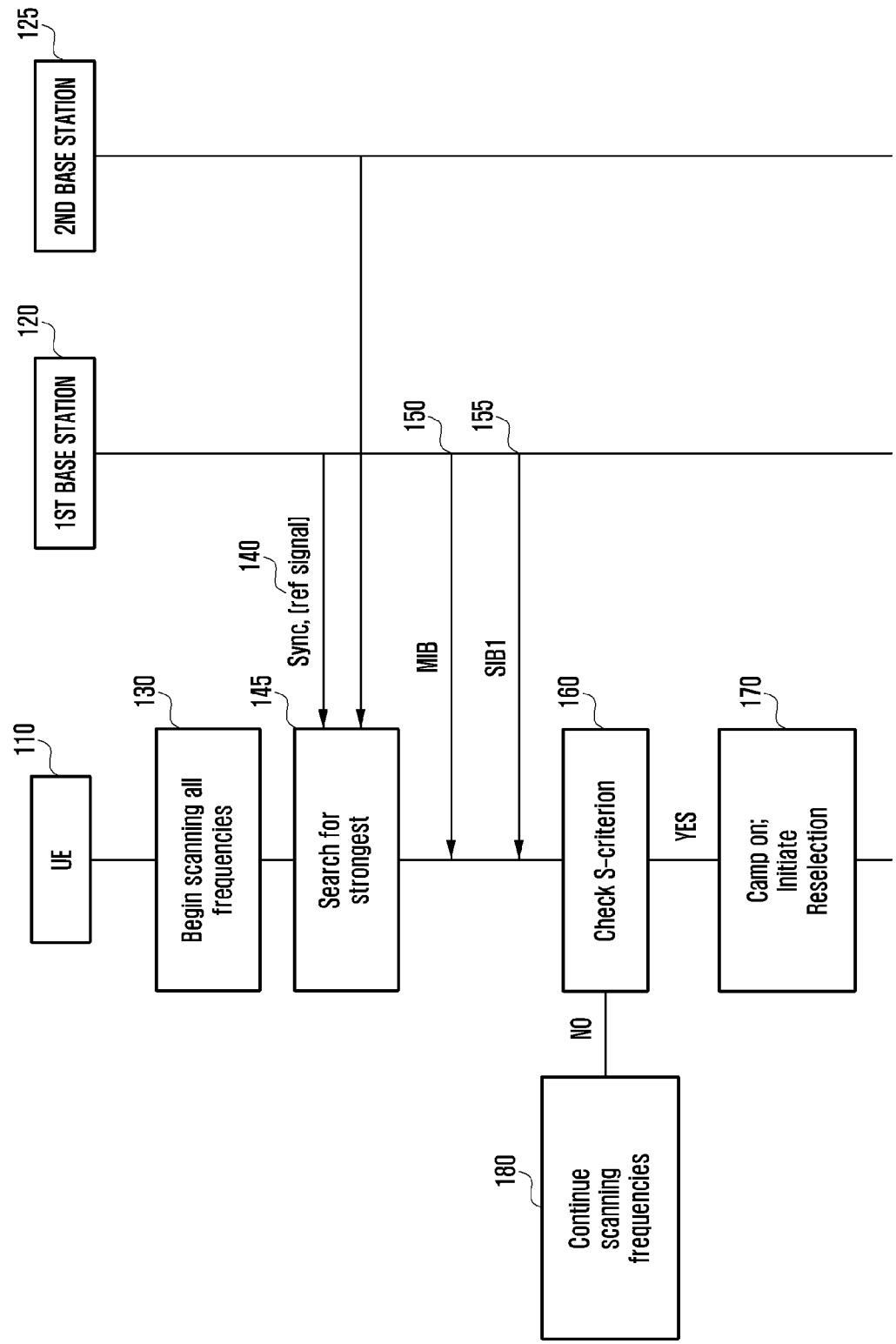
FIG. 1 is a diagram illustrating an example of a cell selection method in existing LTE.

Now, embodiments of the present invention will be described in detail with reference to the accompanying drawings. In the following description of embodiments, descriptions of techniques that are well known in the art and not directly related to the present invention are omitted. This is to clearly convey the subject matter of the invention by omitting any unnecessary explanation.

When it is stated that a certain element is "coupled to" or "connected to" another element, the element may be directly coupled or connected to another element, or a new element may exist between both elements. Also, the terms "include", "comprise", and "have" as well as derivatives thereof, mean inclusion without limitation.

In embodiments of the present invention, elements are shown independently to indicate different characteristic functions, but this does not mean that each element is formed of separate hardware or one software unit. That is, respective individual elements are merely for convenience of explanation, and at least two elements may form one element, or one element may be divided into a plurality of elements to perform a function. In any case, related embodiments are also included within the scope of the present invention.

In addition, some elements are not always essential to perform essential functions in the present invention, and may be optional elements only to improve performance. Therefore, the present invention may be implemented only with elements essential for realizing the subject matter of the present invention except for the components used for performance enhancement, and can be implemented with only the essential elements except for optional elements used for performance improvement.

The terms used herein should not be construed as limited to ordinary or dictionary definition terms, but should be construed in light of the meanings and concepts consistent with the subject matter of the present invention on the basis of the principle that the inventor can properly define his own invention as the concept of the term to describe it in the best way. It is therefore to be understood that embodiments disclosed herein are merely exemplary and various equivalents or modifications thereof are possible.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

The term "unit", as used herein, refers to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

In the next generation wireless communication system (NR, new radio, NG, next generation, 5G, etc.), a network environment for supporting various services is discussed as one of requirements. The network setting optimized to support each service may be referred to as a slice.

The service (or slice) may have the following meanings.
The service (or slice) includes, but not limited to, standardized transmission and reception data types such as enhanced mobile broadband (eMBB), ultra-reliable and low latency communication (URLLC), massive machine type communication (mMTC), device to device communication (D2D), multimedia broadcast/multicast service (MBMS), vehicle to everything (V2X), and voice over internet protocol (VoIP).
The service (or slice) may be a type specified by a communication operator.
The service (or slice) may be a specific application type that is transmitted and received using a communication network.

A terminal should establish a wireless connection with a base station in order to transmit and receive information. At this time, the target of wireless connection is a transmission reception point (TRxP), a cell, an eNB, a base station, a gNB (NR node B), and the like (The term 'cell' is used in embodiments of the present invention but is not limited to the concept of a cell).

In a general wireless communication system, there are many base stations, which can support uplink (UL) and downlink (DL) communication with many terminals.

In the next generation wireless system (NR, new radio) under discussion in the 3GPP standard, transmission using different numerologies on physical resources for each service is considered.

The NR system is characterized by supporting communication in a variety of frequency bands such as below 6 GHz (e.g., ~700 MHz) and above 6 GHz (e.g., mmWave). Because the characteristics of wireless communication are different in respective frequency bands, supportable services may be varied according to frequency bands.

For example, it is expected that the machine-type communication (MTC) is not supported in the high-frequency band with relatively short coverage.

Considering the service type and its meaning supported by the NR, any terminal that supports the NR communication should be able to transmit and receive information about one or more services through an NR protocol interface. In addition, information corresponding to each service should be able to be transmitted and received using different radio resource configurations and resources.

For convenience of explanation, the terms "cell", "eNB", "base station", or "TRP" may be used interchangeably herein. Also, the terms "radio resource configuration", "service", or "slice" may be used interchangeably.

In the present invention, a "downlink transmission signal" used by the terminal for cell search, measurement and selection may be a cell-specific reference signal, a slice-specific reference signal, a cell-specific synchronization signal, a slice-specific synchronization signal, and a signal that is designed in common among a plurality of slices and transmitted on a downlink channel by a cell.

The limitation of the existing LTE scheme is that although it is possible to designate frequency priorities, there is no way to distinguish service priorities because of no way to apply service information to a cell (re)selection. Therefore, in an embodiment of the present invention, a cell (re) selection method that reflects service information is provided. Also, an embodiment of the present invention provides a cell selection method of a terminal which is in a radio resource control (RRC) idle state in a wireless communication system. Particularly, in an embodiment of the present invention, a cell selection operation of a terminal in a wireless communication system where a terminal supporting at least one slice (service) and a base station supporting at least one slice (service) are simultaneously present will be described.

A cell (re)selection method that reflects service information according to an embodiment of the present invention may include 1) an operation of updating target cell information and thereby rechecking whether a cell is selected, 2) a method of checking information only transmitted by the best ranked cell in each retrieved frequency, 3) a method of selecting the best ranked cell and selecting a slice for receiving paging in the selected cell, 4) a method of performing a cell selection operation independently for service/slice, 5) a method of selecting a specific service/slice as a reference slice for performing a cell selection operation, and 6) a cell selection method for supporting a service to paging reception data.

A cell selection operation considering such service characteristics may include a step of transmitting service information supported by a base station to a terminal through system information, a step of setting a parameter required in an RRC release for a cell reselection operation of a terminal, and a step of a cell reselection operation of a terminal.

Hereinafter, embodiments of the present invention will be described in detail.

As described above, although it is possible to designate frequency priorities, the cell selection and reselection method in the existing LTE has a limitation that there is no way to distinguish service priorities because of no way to apply service information to a cell (re)selection.

FIG. 1 is a diagram illustrating an example of a cell selection method in existing LTE.

Referring to FIG. 1, in the LTE, the cell selection method allows a terminal (UE) 110 to select a cell, based on signal strength (e.g., reference signal received power (RSRP), reference signal received quality (RSRQ), or the like).

At step 130, the UE 110 may begin scanning for all frequencies. At step 140, at least one of a first base station 120 and a second base station 125 may transmit a reference signal to the UE 110. At this time, the reference signal may be a synchronization (sync.) signal. At step 145, the UE 110 may search for a reference signal having the largest signal strength. At steps 150 and 155, the first base station 120, for example, may transmit system information to the UE 110. For example, the system information may be transmitted to the UE 110 via a master information block (MIB), a system information block (SIB), or the like.

Meanwhile, at step 155, the first base station 120 may set priority for a frequency band value in a cell (re)selection operation through the system information (SI) (e.g., SIB1) to the UE 110. At step 160, the UE 110 may determine a suitable cell for (re)selection by performing a measurement on a high-priority frequency band and comparing signal strengths based on metric such as RSRP or RSRQ set by the base station 120. At this time, a ranking-based cell selection may be performed for frequencies having the same priority. That is, at step 160, the UE 110 may determine whether the RSRP, RSRQ, or the like is greater than a predetermined value for a high-priority frequency band. If so, the UE 110 may camp on a corresponding cell at step 170 and initiate a cell reselection. If not so, the UE 110 may perform scanning for frequency bands of the next priority at step 180.

In other words, although it is possible to designate frequency priorities, there is no way to distinguish service priorities when applying the LTE scheme because of no way to apply service information to a cell (re)selection.

Figure 2:
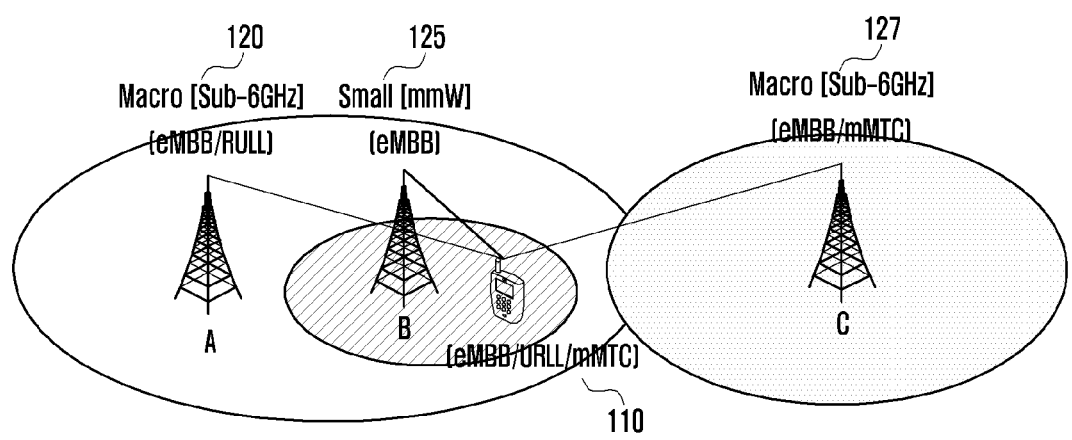
FIG. 2 is a diagram illustrating the necessity of considering service information in a cell selection operation of a terminal due to different services and coverage supportable by respective base stations (cells) in a communication system according to an embodiment of the present invention.

FIG. 2 is a diagram illustrating the necessity of considering service information in a cell selection operation of a terminal due to different services and coverage supportable by respective base stations (cells) in a communication system according to an embodiment of the present invention.

Referring to FIG. 2, the UE 110 may be a terminal that requests at least one of eMBB, URLLC, and mMTC services. The first base station 120 may be a macro base station that supports eMBB and URLLC, the second base station 125 may be a small base station that supports eMBB, and the third base station 127 may be a macro base station that supports eMBB and mMTC. In this case, the macro base station may support a frequency band of 6 GHz or less, and the small base station may support mmWave.

When the UE 110 requests the eMBB service, the UE 110 may receive the eMBB service from all of the first base station 120, the second base station 125, and the third base station 127. In this case, the UE 110 may select a cell having the largest signal strength. However, when the UE 110 requests the URLLC service, the UE 110 may receive the URLLC service from the first base station 120 only. In this case, it may be unnecessary for the UE 110 to measure and consider the reference signal strength from the second base station 125 and the third base station 127 for a cell selection. That is, because the second base station 125 and the third base station 127 cannot provide the URLLC service, the UE 110 that selects the cell of the second base station 125 or the third base station 127 may not receive the URLLC service. Therefore, the UE 110 needs to perform an operation for the cell selection in consideration of requested service information. This may be similar when the UE 110 requests the mMTC service.

Figure 3:
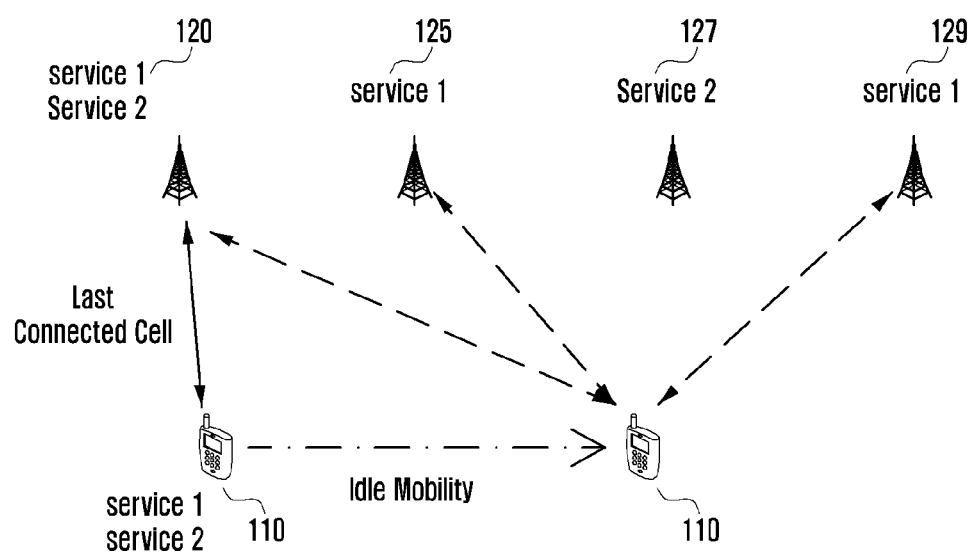
FIG. 3 is a diagram illustrating the necessity of considering service information when a terminal (re)selects a cell in case of an idle mobility of the terminal (in case of movement of the terminal in an idle state or an inactive state) because of different services supportable by respective base stations (cells) in a communication system according to an embodiment of the present invention.

FIG. 3 is a diagram illustrating the necessity of considering service information when a terminal (re)selects a cell in case of an idle mobility of the terminal (in case of movement of the terminal in an idle state or an inactive state) because of different services supportable by respective base stations (cells) in a communication system according to an embodiment of the present invention.

Referring to FIG. 3, the UE 110 may be a terminal that supports at least one of a first service (service 1) and a second service (service 2). In addition, the UE 110 may be connected last to the first base station 120 that supports the first service and the second service. Also, the UE 110 may be changed from the RRC connected state to the RRC idle state, and may move.

At this time, the UE 110 may select a cell of at least one of the first base station 120, the second base station 125, and the fourth base station 129 to receive the first service. However, because the third base station 127 is a base station that provides only the second service, the UE 110 should not select the third base station 127 in order to receive the first service. Accordingly, when the UE 110 (re)selects a cell, it is necessary to perform an operation for cell selection in consideration of service information.

Figure 4:
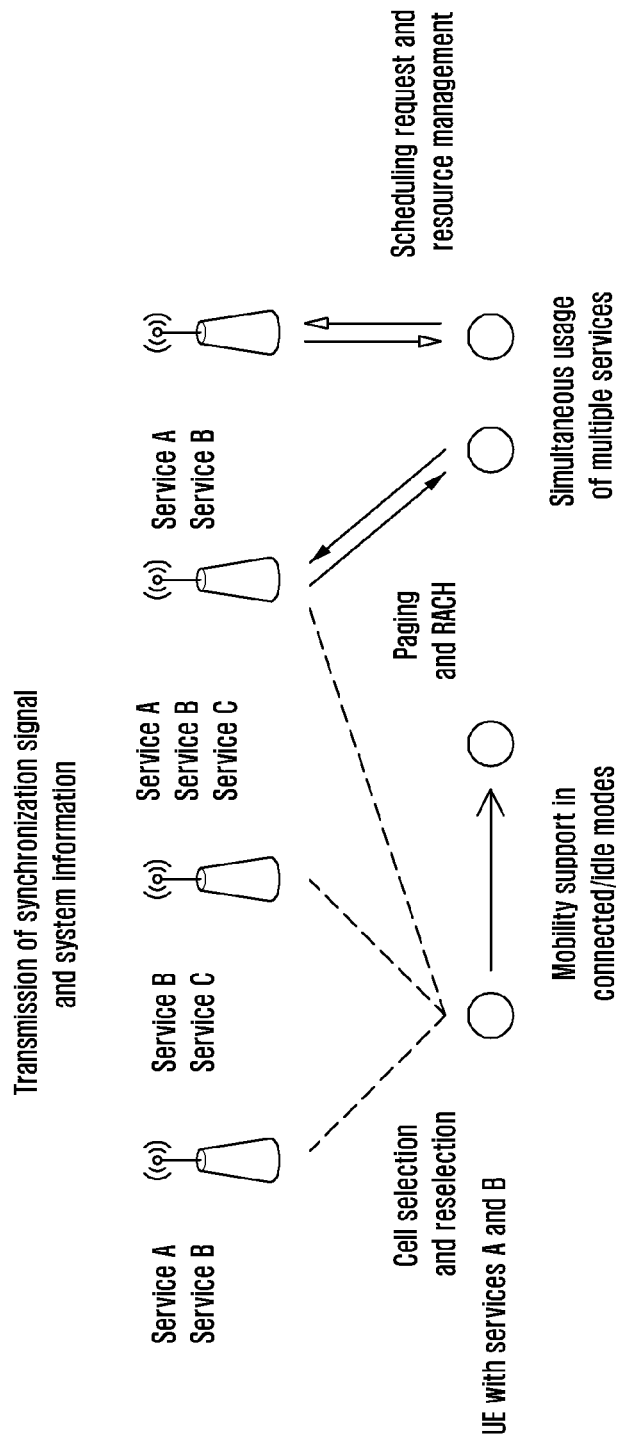
FIG. 4 is a diagram illustrating a transmission/reception scenario between a network unit and a terminal in an NR system supporting a plurality of services (slices) in a communication system according to an embodiment of the present invention.

FIG. 4 is a diagram illustrating a transmission/reception scenario between a network unit and a terminal in an NR system supporting a plurality of services (slices) in a communication system according to an embodiment of the present invention.

Referring to FIG. 4 that shows a transmission/reception scenario between a network unit and a terminal (UE) in an NR system supporting a plurality of services (slices), the UE may support a service (slice) A and a service (slice) B. At this time, the UE may desire to select the cell (re)selection for reasons of mobility or the like. For this, the base stations may transmit a reference signal (or a synchronization signal) to the UE, and the UE may perform the cell (re)selection by measuring the quality or strength of the reference signal.

In this case, the reselection may be performed for a co-located cell or intra-frequency. At this time, the UE may select the best cell based on RSRP (or RSRQ). Also, the reselection may be performed for a non-co-located cell or inter-frequency. At this time, if the best cell (base station) does not support a specific service (for example, supports only service B without supporting service A), the UE may select the best cell and then receive paging with the best effort slice. Then, according to the paging reception, the UE may select a cell that supports both the service A and the service B.

When the UE supports one or more slices in the communication system according to an embodiment of the present invention, and when each slice means a radio resource configuration corresponding to the configuration of upper layers (e.g., layer 2 and layer 3, etc.) of radio interface and physical resources having different orthogonal frequency division multiplexing (OFDM) numerologies, the present invention may include the following operations.

1) Cell (re)selection operation on a common slice

2) Cell (re)selection operation on a particular slice selected as a reference slice (or a default slice, etc.)

3) Independent cell (re)selection operation for each service-specific slice (or dedicated slice, etc.)

4) Cell (re)selection operation on a slice that is shared among services of a specific group.

For example, in an NR system that supports service A, service B, and service C, a downlink transmission signal (e.g., a synchronization signal or a reference signal (RS)) may be shared between the services A and B, and a downlink transmission signal (e.g., a synchronization signal or an RS) of the service C may be transmitted independently of the other services A and B. In a related embodiment, a design (configuration) of a synchronization signal (or a reference signal) may be shared between eMBB and URLL, and a synchronization signal (or a reference signal) of mMTC has an independent design.

Now, a cell selection operation using a service-specific slice selected/set as a common slice or a reference slice will be described. This corresponds to the cell (re)selection operation on the common slice in the above item 1) and the cell (re)selection operation on the particular slice selected as the reference slice in the above item 2).

At the UE, it is possible to determine slice information for transmission and reception traffic supported by the UE (that is, identify, at the UE, the list of supported slices).

Also, the UE may select a frequency band for a cell search. At this time, depending on embodiments, the priority of a frequency band to be selected and searched for according to a slice supported by the UE may be varied.

The UE may determine or select a slice to perform a cell selection operation. Here, the slice may refer to a signal transmitted at fixed time and frequency positions within a downlink transmission bandwidth.

Thereafter, the UE may search for a cell in the selected slice. According to an embodiment, the UE may detect a cell, based on a downlink transmission signal transmitted by each cell.

At this time, the downlink transmission signal may be a reference signal and a synchronization signal.

In addition, the UE may determine a reference signal position for signal strength measurement, based on a found cell ID. The reference signal may be a position corresponding to a specific slice in time and frequency resources.

Then, the UE may perform ranking for a cell searched for and signal strength measured. According to an embodiment, this ranking may be ranking by signal strength.

The UE may select a target cell, based on the ranking. According to an embodiment, the target cell may be a cell determined to have transmitted the strongest signal, based on the result of signal strength measurement.

The UE may receive broadcast information of the target cell. According to an embodiment, the broadcast information may include slice information supported by a cell.

In addition, the UE may determine whether the target cell is selected.

Next, a cell selection operation using a slice specialized for a specific service will be described. This corresponds to the independent cell (re)selection operation for each service-specific/dedicated slice in the above item 3) and the cell (re)selection operation on a slice shared among services of a specific group in the above item 4).

At the UE, it is possible to determine slice information for transmission and reception traffic supported by the UE (that is, identify, at the UE, the list of supported slices).

Also, the UE may select a frequency band for a cell search. At this time, depending on embodiments, the priority of a frequency search and the number of frequency bands for a cell search may be differently selected or set according to a slice.

The UE may determine or select a slice for measuring the signal strength. For this purpose, the UE may measure different signals for each slice according to each of the above cases. In another embodiment, the UE may determine a specific slice for the cell selection operation. In still another embodiment, the network may inform the UE about a specific slice to perform the cell selection operation.

The UE may measure the signal strength and rank the measured signal strength. This may be to determine the best cell (or cell having the strongest signal strength) and perform cell ranking. For this purpose, the UE may independently measure and rank the signal strength on each slice resource. In another embodiment, the UE may measure and rank the signal strength at a specific slice selected by the UE as described above.

The UE may select the target cell, based on a value of the measured signal strength.

In addition, the UE may receive information transmitted by the target cell via a broadcast channel. At this time, the target cell may transmit a list of slices supported by the target cell to the UE.

Based on the broadcast information, the UE may determine whether to select a corresponding cell.

At this time, the slice in which the broadcast information is scheduled and transmitted may be a position of a service-specific (e)PDCCH and a service-specific data transmission channel.

Next, a method of selecting a cell based on a supported services indication transmitted by the UE will be described.

A problematic situation is a case where the UE fails to find a suitable cell even though performing a cell search and determining service information supported by each cell searched for.

A solution to the above problematic situation is that the UE transmits support service information to the network, receives information on a cell supporting the service from the network, and selects a desired cell.

At this time, a manner used by the UE to transmit an indication indicating the support service information to the network may include at least one of a random access channel, an uplink signal on a common slice or a default slice, and an uplink signal on a slice selected as a reference slice.

In addition, information delivered to the network by the UE may include names of services supported by the UE and a list thereof. Also, this information may include information on a random access resource which is set as a part of a service/slice supported by the UE (e.g., a frame structure of a preamble group or an uplink channel, a position in time and frequency resources, etc.). Also, this information may include information on a resource corresponding to a service supported by the UE among random access resources allocated to each service/slice by the base station (e.g., a frame structure of a preamble group or an uplink channel, a position in time and frequency resources, etc.).

In addition, the information delivered to the network by the UE may take a bitmap form for a list of all services supported by the entire NR system. Also, this information may be delivered in the form of a bit-indication on a physical channel in a common slice or a service-specific slice.

The information delivered to the UE by the network may be transmitted via a downlink physical channel on a common slice or a service-specific slice.

A detailed (subordinate) operation and apparatus related to the cell selection of the UE proposed by the present invention (e.g., an operation of measuring a downlink reference signal of a cell, an operation of ranking a cell, receiving broadcast information from a cell, acquiring/setting a control channel position, etc.) may be similar to those of the existing LTE and may be commonly used in schemes proposed by the present invention.

Meanwhile, in the present invention, detailed examples of 1) a cell (re)selection operation on a common slice; 2) a cell (re)selection operation on a particular slice selected as a reference slice (or a default slice, etc.); 3) an independent cell (re)selection operation for each service-specific/dedicated slice; and 4) a cell (re)selection operation on a slice shared among services of a specific group may be as follows.

A case where all services share a synchronization signal is that multiple frequency/time portions using different numerologies (e.g., including TTI, sub carrier spacing, etc.) share the same synchronization signal. This shared signal may be part of a specially designed common slice or part of a service-specific slice selected as a default (or reference) slice.

The base station (cell) may transmit a separate synchronization signal for each service. Each frequency/time portion of the physical resource with a particular set of numerology (e.g., including TTI, sub carrier spacing, etc.) may use a particular synchronization signal.

The synchronization signal may be shared among some of the multiple frequency/time portions using different numerologies (e.g., including TTI, sub carrier spacing, etc.).

The above embodiment may also be applied to a reference signal transmitted by a cell on a common slice or on a service-specific slice. A method and operation of (re)selecting multiple cells according to an embodiment of the present invention will be described in detail below.

The UE according to an embodiment of the present invention preferentially considers a cell that supports all services required for the UE, and may perform an operation for a cell selection when a target cell does not support all slices supported by the UE.

Figure 5:
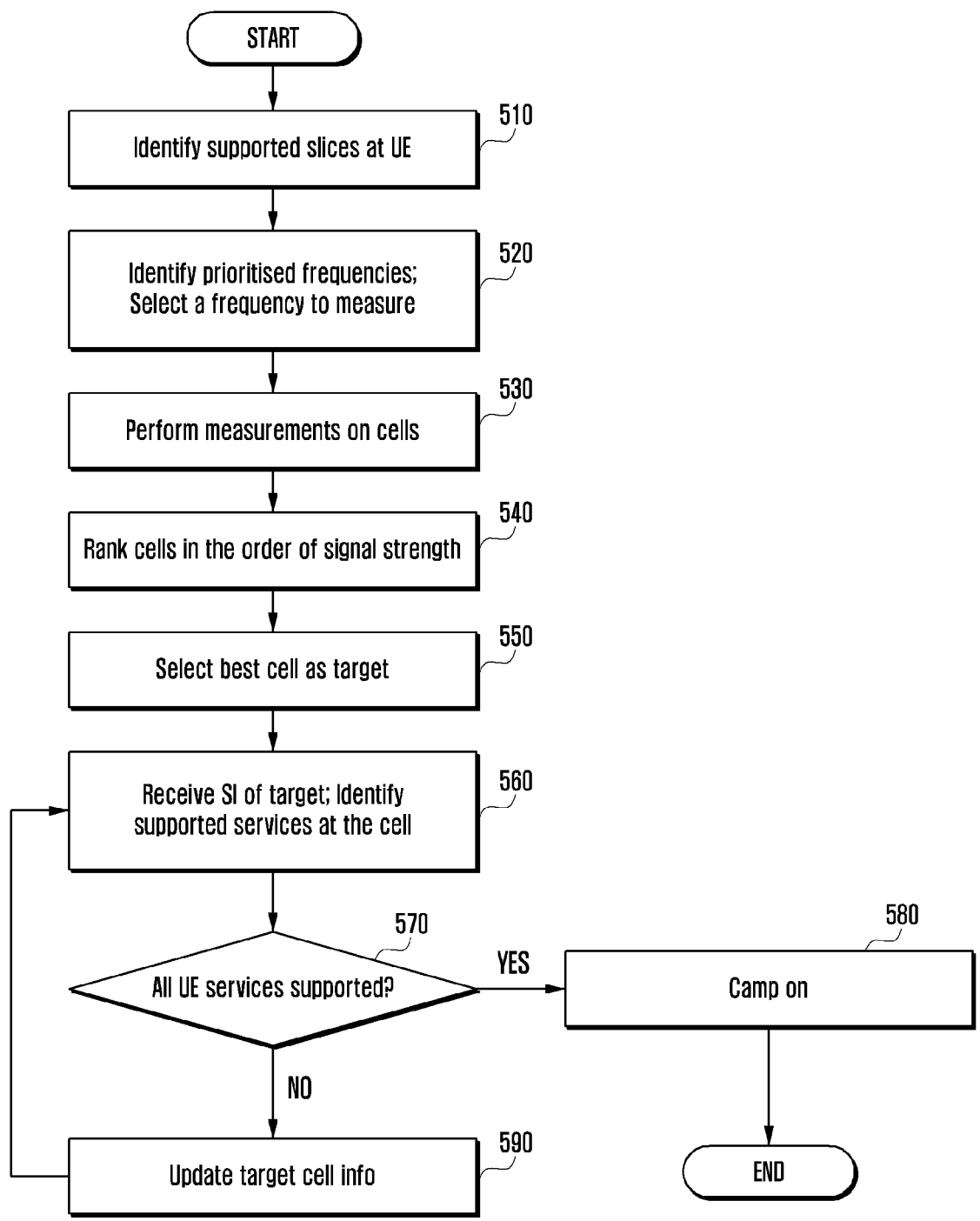
FIG. 5 is a diagram illustrating an example of a cell selection method of a terminal in a communication system according to an embodiment of the present invention.

FIG. 5 is a diagram illustrating an example of a cell selection method of a terminal in a communication system according to an embodiment of the present invention.

According to an embodiment of the present invention, the terminal (UE) may update target cell information and thereby reconfirm whether to select a cell.

Referring to FIG. 5, the UE according to an embodiment of the present invention may update the target cell information and thereby reconfirm whether to select a cell.

At step 510, the UE may determine (identify) service (slice) information supported by the UE.

At this time, the UE may identify a service supported by the UE, based on a specific application and/or subscription information of the UE.

In addition, according to an embodiment, the UE may select a service type of information to be transmitted or received by the UE or a slice corresponding to the information.

At step 520, the UE may select a frequency (a carrier frequency, a radio frequency (RF) band, etc.) for a cell search. According to an embodiment, the frequency for the cell search may be an arbitrary frequency or a high-priority frequency set by the network. According to an embodiment, the UE may identify a high-priority frequency, based on the priorities of the frequencies.

At step 530, the UE may attempt searching/detecting cells on the frequency selected at step 520. That is, the UE may perform cell measurement on the selected frequency.

At step 540, the UE may arrange (rank) cells in the order of received signal strength. At this time, the UE may compare the signal strength with a predetermined threshold value (S-criterion). Then, the UE may designate, as a suitable cell, cells that satisfy a condition that the signal strength is greater than the predetermined threshold value.

At step 550, the UE may select a cell (best ranked cell) having the greatest signal strength as the target cell.

At step 560, the UE may receive broadcast information (e.g., system information (SI), etc.) of the target cell.

In addition, according to an embodiment, the UE may receive the MIB from the target cell, based on the synchronization signal detected at step 530. Also, according to an embodiment, the UE may receive, from the target cell, the SIB required for an operation in an idle state.

In addition, using the system information, the UE may identify information on a slice/service supported by the target cell. This information may be a list of slices/services.

Based on the information on the slice/service supported by the target cell received at step 560, the UE may operate as follows.

At step 570, the UE may confirm whether all slices (services, numerologies) required for support are supported in the target base station (cell).

If so, the UE may select the target cell, camp on the target cell, and monitor a paging signal at step 580.

However, if not so, the UE may update the target base station (cell) at step 590. Then, the SI acquisition step 560 and step 570 are repeated.

According to an embodiment, at step 590, the UE may set the next best ranked cell as the target cell.

Meanwhile, according to an embodiment of the present invention, the UE or the base station may limit the number of target cells to be considered by the UE on a particular frequency.

Embodiments of the ways of limiting the number of search cells (target cells) may be as follows.

The target cells may be limited, based on the metric of cell (re)selection set to the UE by the base station in the RRC (re)configuration message and/or the RRC release message, e.g., based on the receive signal strength such as RSRP, RSRQ, or the like.

At this time, the base station may set a reference threshold value x. According to an embodiment, the threshold value x may be higher than the threshold value used for checking a suitable cell (base station) for the cell reselection.

In another embodiment, the UE may receive the SI only from the cells (base stations) whose ranked signal quality (level) is higher than the threshold value x.

Furthermore, the base station may set the reference threshold value x.

According to an embodiment, when a difference between the received signal level from the best cell and the received signal level from the currently selected (ranked) target cell is smaller than the threshold value x, the UE may receive the SI only from the corresponding cell (base station).

According to an embodiment, the threshold value x may be set as the number of next best cells to be considered as the target cell on a particular frequency band.

Also, according to an embodiment, each base station (cell) may indicate via the MIB whether the UE is allowed to set the next best ranked cell as the next target cell.

According to an embodiment, the network may send, in the SI from the best cell, information on other base station cells and their supported slices (services, numerologies).

Also, according to an embodiment, the UE may obtain the reference threshold value x through the SI from the base station that sends the strongest signal. The SI may be MIB or other SIB.

Meanwhile, when the UE fails to find a suitable cell even though checking information on a given number of target cells (that is, if no cell that supports all the UE slices have been found), the UE may perform steps 520 to 590 at another frequency.

In addition, the number of target cells that the UE considers for cell selection may differ on each frequency. In other words, the limit on the number of target cells may be different for each frequency.

The order of cell search/check according to an embodiment of the present invention may be as shown in Table 1 below.

TABLE 1

| | Best cell | $2^{nd}$ best | $3^{rd}$ best | ... |
|---|---|---|---|---|
| Frequency 1 | | ① → check these cells first | | |
| | | | ② ↓ Move to another frequency | |
| Frequency 2 | ③ → check cells on this frequency | | | |

That is, the UE may check at the first frequency (frequency 1) whether a cell supports all the services (slices) of the UE, in the order of the best cell, the second best cell, and the third best cell. If a suitable cell is not found at the first frequency (frequency 1), the UE may check at the second frequency (frequency 2) whether a cell supports all the services (slices) of the UE, in the order of the best cell, the second best cell, and the third best cell. At this time, the number of checked cells at the first frequency (frequency 1) and the number of checked cells at the second frequency (frequency 2) may be different from each other. For example, the UE may check three cells at the first frequency (frequency 1) and check two cells at the second frequency (frequency 2).

Figure 6:
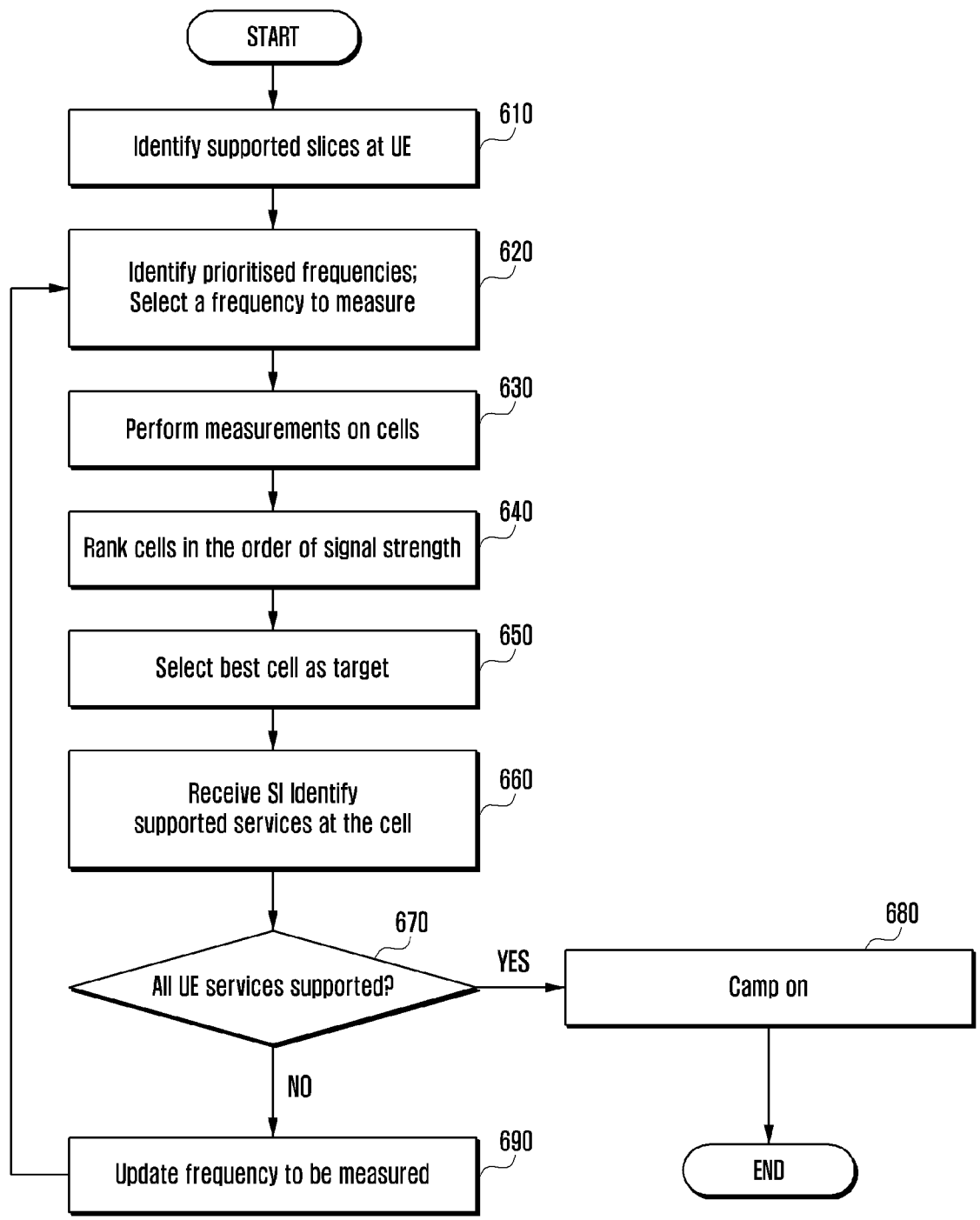
FIG. 6 is a diagram illustrating another example of a cell selection method of a terminal in a communication system according to an embodiment of the present invention.

FIG. 6 is a diagram illustrating another example of a cell selection method of a terminal in a communication system according to an embodiment of the present invention. According to an embodiment of the present invention, the terminal (UE) may check only information transmitted by the best ranked cell at each searched frequency.

Referring to FIG. 6, the UE according to an embodiment of the present invention may check only information transmitted by the best ranked cell at each searched frequency. In this case, after updating target frequency information, the UE may perform cell measurement, ranking, target cell selection, and system information (SI) reception.

For example, in case where all the cells on each frequency carrier are set to support the same service, the UE may such operations.

At step 610, the UE may determine (identify) service (slice) information supported by the UE.

At this time, the UE may identify a service supported by the UE, based on a specific application and/or subscription information of the UE.

In addition, according to an embodiment, the UE may select a service type of information to be transmitted or received by the UE or a slice corresponding to the information.

Meanwhile, the reason that the UE requests a connection to the base station may be identified as, for example, a network initial attach request in an upper layer (NAS) of the control plane, or a service request for actual information transmission and reception.

At step 620, the UE may select a frequency (a carrier frequency, an RF band, etc.) for a cell search. According to an embodiment, the frequency for the cell search may be an arbitrary frequency or a high-priority frequency set by the network. According to an embodiment, the UE may identify a high-priority frequency, based on the priorities of the frequencies.

In addition, based on the service information acquired at step 610, the UE may determine a particular frequency as a search target.

At step 630, the UE may attempt searching/detecting cells on the frequency selected at step 620. That is, the UE may perform cell measurement on the selected frequency.

At step 640, the UE may arrange (rank) cells in the order of received signal strength.

At this time, the UE may compare the signal strength with a predetermined threshold value (S-criterion). Then, the UE may designate, as a suitable cell, cells that satisfy a condition that the signal strength is greater than the predetermined threshold value.

At step 650, the UE may select the best ranked cell having the greatest signal strength as the target cell.

At step 660, the UE may receive broadcast information (e.g., system information (SI), etc.) of the target cell.

In addition, according to an embodiment, the UE may decode the MIB, based on an ID used for the generation of a synchronization signal by the base station. In addition, according to an embodiment, the UE may receive the SIB required for the operation in the idle state from the target cell.

In addition, using the system information, the UE may identify information on a slice/service supported by the target cell. This information may be a list of slices/services.

At step 660, the UE may check whether information on the slice/service supported by the target cell is identical to the service (slice) determined at step 610.

If the information on the slice/service supported by the target cell is identical to the service(s) requested by the UE, the UE may select the target cell at step 580. Then, the UE may camp on the target cell and monitor the paging signal.

However, if the information on the slice/service supported by the cell is not identical to the service(s) requested by the UE, the UE may update at step 690 the frequency to be measured. That is, the UE may move to a different carrier frequency and perform a cell search operation. That is, the UE may perform at step 620 the cell search operation on another frequency.

Meanwhile, the communication method according to an embodiment of the present invention may limit the UE measurement for cell selection, the cell search, and the SI acquisition.

This is for optimization of the embodiment related to FIG. 6, and to control power consumption in the operation of repeating steps 620 to 690 for each frequency in order for the UE to select a cell that supports all service requested by the UE.

For this purpose, the UE may keep a counter (e.g., the number of cells searched (NUM_CELL_SEARCHED)).

Also, the UE may obtain the maximum number of cells to search (e.g., MAX_NUM_SEARCH). At this time, the UE may obtain such information through the SI of the serving cell.

The UE may initiate or reset or set the counter (NUM_CELL_SEARCHED) to 0 when the cell (re)selection is triggered.

In addition, the UE may increment the counter (NUM_CELL_SEARCHED) when the UE enters another cell search process. The operation of incrementing the counter may be applied to intra-frequency and inter-frequency cell search procedures.

The UE may repeat the cell (re)selection operation until an appropriate cell is found or until the counter (NUM_CELL_SEARCHED) reaches a value (MAX_NUM_SEARCH) indicating the maximum number of search cells.

When the cell (re)selection is completed (i.e., if a cell is found), the UE may clear the counter (NUM_CELL_SEARCHED).

In case of failing to find a cell supporting the slice (or service, numerology, etc.) requested by the UE in the searched frequency band even if the counter (NUM_CELL_SEARCHED) reaches the value (MAX_NUM_SEARCH) indicating the maximum number of search cells, the UE may enter and perform a recovery procedure.

The recovery procedure may include the following operation.

The UE may send a notification message to the base station (eNB) or the network.

For example, the UE may transmit a notification message indicating the occurrence of outage to the base station. Also, for example, the UE may transmit, to the base station, information requesting to setup necessary configuration at RAN for UE supported services. Also, for example, the UE may transmit, to the base station, information indicating which services are supported by the UE or which slice needs cell selection for paging reception.

According to an embodiment, an operation similar to the operation of performing the cell (re)selection using the counter may be performed based on a timer.

For example, the UE may set a timer (e.g., a cell search timer (Tcell_search)) for the cell search instead of the counter (NUM_CELL_SEARCHED) Then, the UE may trigger the cell search timer (Tcell_search) and perform the cell search procedure within a given time. In this case, the UE may receive the Tcell_search through the SI of the serving cell. Also, in case of failing to find an appropriate cell within the Tcell_search, the UE may perform an operation similar to the recovery procedure.

According to an embodiment, the operation of performing the cell (re)selection may be performed for each service.

For example, when the UE selects a cell based on a specific service (e.g., URLLC traffic), the UE may perform the cell (re)selection by selecting at least one of a searched/measured cell count based operation (i.e., an operation using NUM_CELL_SEARCHED and MAX_NUM_SEARCH) and a timer based selection operation (i.e., an operation using Tcell_search). Also, according to an embodiment, the UE may differently set, for each service, the searched/measured cell count (NUM_CELL_SEARCHED, MAX_NUM_SEARCH) or the value of Tcell_search.

Meanwhile, in case of failing to find an appropriate cell based on a service supported by the UE, the UE may perform the same or similar operation as or to the recovery procedure in the communication method according to an embodiment of the present invention.

For example, there may be the UE that supports a plurality of services (e.g., supporting services A and B based on subscription information).

First, the UE may perform a cell measurement and search procedure. Then, the UE may not find a cell that supports both service A and service B.

In this case, the UE may transmit, to the network or the base station, information indicating a failure to find an appropriate cell supporting both the services A and B.

According to an embodiment, using the best effort slice, the UE may transmit such information indicating a failure to find an appropriate cell. The best effort slice may refer to a service-common transmission signal, channel, message, or the like. Also, the best effort slice may refer to a common slice or reference slice that can be used by all UEs. For example, the best effort slice may refer to an uplink resource (a time and frequency resource position, or a transmission message) that can be commonly used regardless of the service type.

In addition, according to an embodiment, when the UE fails to find an appropriate cell supporting both the services A and B, the UE may select a cell supporting one of the services supported by the UE and perform an idle operation (e.g., a paging message reception) other then the cell selection.

At this time, the UE may operate differently depending on the presence or absence of uplink data (mobile originated (MO) data).

For this purpose, the UE may determine whether the MO-data exists. If so, the UE may determine the service or slice type of the MO-data. According to an embodiment, with respect to data stored in a buffer of the UE, the UE may determine whether the MO-data exists and determine the service (slice) type of the MO-data. Alternatively, the UE may receive service/slice type information determined by an upper layer or the like.

If there is uplink transmission data (MO-data) in the UE, the UE may receive the SI by selecting a cell supporting the slice of the uplink transmission data. At this time, the UE may selectively receive only the SI of the corresponding slice.

If the uplink transmission data (MO-data) does not exist in the UE, the UE may select a cell, based on paging configuration information transmitted from each candidate cell. For example, the UE may receive information on a paging cycle, a paging indication transmission time, etc., through the SI. Also, the base station may inform the UE about whether there is a paging message for each service. In this case, information on the presence or absence of the paging message for each service may be transmitted through the SI, as a message on a data channel, or an indication on a physical channel. Then, the UE receiving this information may select and connect a cell on the basis of the received information.

Meanwhile, a method and apparatus for indicating a list of supported slices or services at a given cell may be as shown in Table 2, for example.

Referring to Table 2, the service list may be in the form of a mapping table that indicates whether each service is supported or not by a cell. For example, a supported service may be indicated as "1", and a non-supported service may be indicated as "0".

The service list may be transmitted to the UE through broadcast information by the cell.

TABLE 2

| Supportability of Service A | Supportability of Service B | Supportability of Service C |
|---|---|---|
| 1 | 0 | 0 |

The operations and methods proposed as part of the cell selection scheme may be applied to other cell selection schemes.

According to an embodiment of the present invention, the UE may select the best ranked cell and select a slice for paging reception in the corresponding cell.

For this, the UE may receive paging in the best effort slice. At this time, the best effort slice may refer to a common slice, a reference slice, or a service-specific slice, which is available to all UEs.

The UE may identify a UE ID by receiving the paging message, and check the existence of downlink (DL) data (or mobile terminated (MT) data) and slice ID information. If the received paging indicates that that there is no DL data, the UE may return to a sleep operation.

However, if the received paging indicates that there is the DL data, but if the corresponding cell (base station) does not support the slice for the DL data, the UE may select another cell that supports the slice.

If the received paging indicates that there is the DL data, and if the corresponding cell (base station) supports the slice for the DL data, the UE may perform an initial random access channel (RACH) for initiating an RRC access to the corresponding cell (base station).

Figure 7:
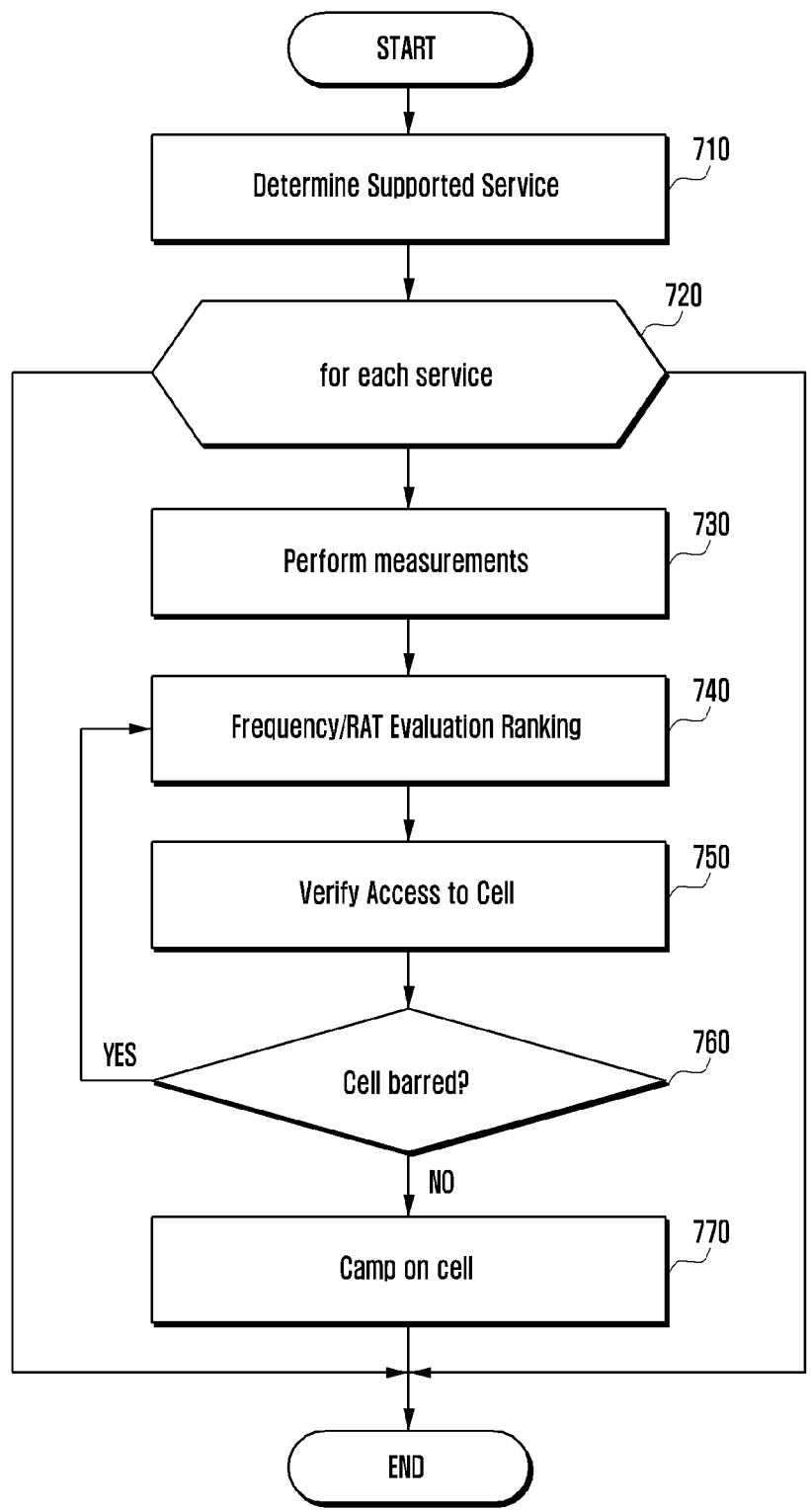
FIG. 7 is a diagram illustrating still another example of a cell selection method of a terminal in a communication system according to an embodiment of the present invention.
Figure 8:
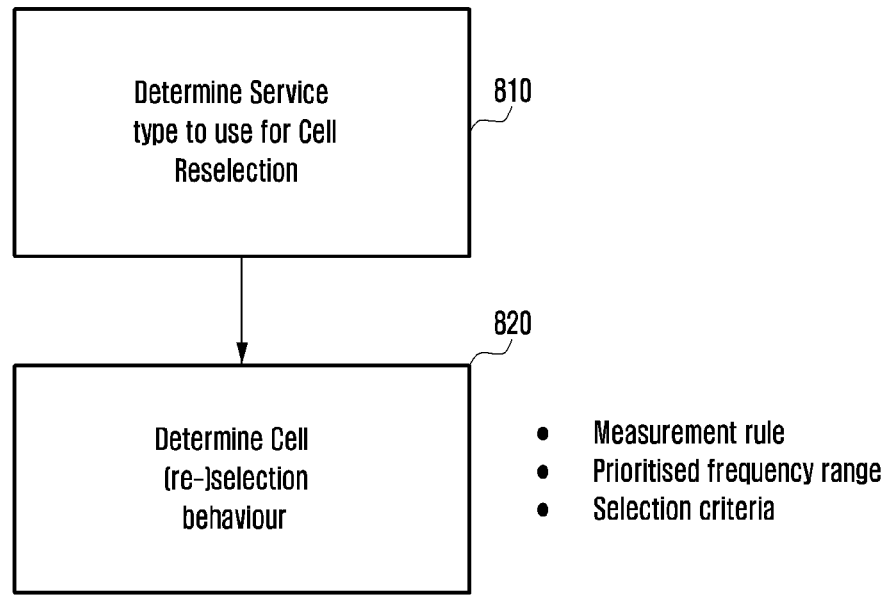
FIG. 8 is a diagram illustrating an example of defining independent cell selection conditions for each service in a communication system according to an embodiment of the present invention.

FIG. 7 is a diagram illustrating still another example of a cell selection method of a terminal in a communication system according to an embodiment of the present invention. FIG. 8 is a diagram illustrating an example of defining independent cell selection conditions for each service in a communication system according to an embodiment of the present invention.

According to an embodiment of the present invention, the terminal (UE) may independently perform a cell selection operation for each service/slice.

Referring to FIG. 7, in the communication system according to an embodiment of the present invention, the UE may independently perform the cell selection operation for each service/slice. Referring to FIG. 8, in the communication system according to an embodiment of the present invention, the UE may apply an independent cell selection condition for each service when independently performing the cell selection operation for each service/slice. Hereinafter, this will be described in detail.

In this embodiment, a plurality of cell selection procedures may be performed in one UE, and the cell selection may be independently transitioned to an idle state for each service.

Referring to FIG. 7, the UE may independently select a cell for each supported service. In addition, according to an embodiment, the UE may independently perform other idle mode procedures such as a paging message reception for each service after the cell selection. In addition, according to an embodiment, the UE may separately receive a paging message for each slice. Also, according to an embodiment, a tracking area update (TAU) may be performed separately for each slice. Further, according to an embodiment, the random access operation and the information transmission/reception in the connected state of the UE may be performed separately for each slice.

At this time, an example of the case where the UE supports a plurality of services may be as follows.

For example, there may be case 1 in which the UE supports eMBB (eg UHD) and VoIP, case 2 in which the UE supports MTC and URLL, and case 3 in which the UE supports eMBB and URLL. Also, the UE may support eMBB, MTC, and URLLC.

The case 1 will be described with reference to FIG. 7 as an example.

At step 710, the UE may determine a supported service (slice). For example, the UE may confirm that eMBB and VoIP are supported.

Then, at step 720, the UE may determine whether to perform steps 730 to 770 for each service. For example, the UE may perform steps 730 to 770 for the eMBB service. Then, the UE may perform steps 730 to 770 for the VoIP service.

First, at step 730, the UE may perform measurements on a serving cell supporting the eMBB service and neighboring cell.

Then, at step 740, the UE may perform frequency/RAT ranking based on a result measured at step 730.

At step 750, the UE may select a target cell. The target cell may be the best ranked cell at step 740. In addition, at step 760, the UE may determine whether access to the target cell is allowed.

If it is determined at step 760 that the access to the target cell is allowed (i.e., not barred), the UE may select the target cell (camp on) and perform the idle procedure at step 770.

If the access to the target cell is not allowed, the UE may return to step 740 and select the next best cell based on ranking. Then, steps 750 to 770 may be performed.

Meanwhile, the detailed operation in each step may be similar to the procedure in which the LTE UE selects a cell.

After completing the cell (re)selection for the eMBB service (slice), the UE may repeat steps 730 to 770 for the VoIP service (slice).

Similarly, referring to FIG. 8, at step 810, the UE may determine a service type to be used for cell (re)selection. Then, at step 820, the UE may perform the cell (re)selection based on the selected service. At this time, the cell (re) selection may be performed according to a measurement rule, a prioritized frequency range, selection criteria, a frequency range to be measured, and the number of cells to be measured.

According to an embodiment of the present invention, the UE may select a specific service/slice as a reference slice for performing the cell selection operation (i.e., there is a single selection and idle state transition per UE).

When the cell selection operation is different for each service, a cell may be selected from a slice selected by the UE.

First, the UE may select a service/slice as a reference for performing the cell selection operation. At this time, the selection criterion of the service/slice for performing the cell selection operation may be one of the following examples.

For example, the UE may select a service/slice as a reference for performing the cell selection operation, based on at least one of a high-priority service designated by subscription information of the UE, a service expected to consume the minimum power for cell selection operation or paging, a service type of information to be transmitted on uplink by the UE, a service type of information to be received on downlink by the UE, or a service type of information most frequently transmitted or received by the UE for a given time.

Then, the UE may perform the cell selection operation by using a slice corresponding to the selected service.

Thereafter, the UE may perform an idle, connected, or connected-inactive state operation in the selected cell.

Figure 9:
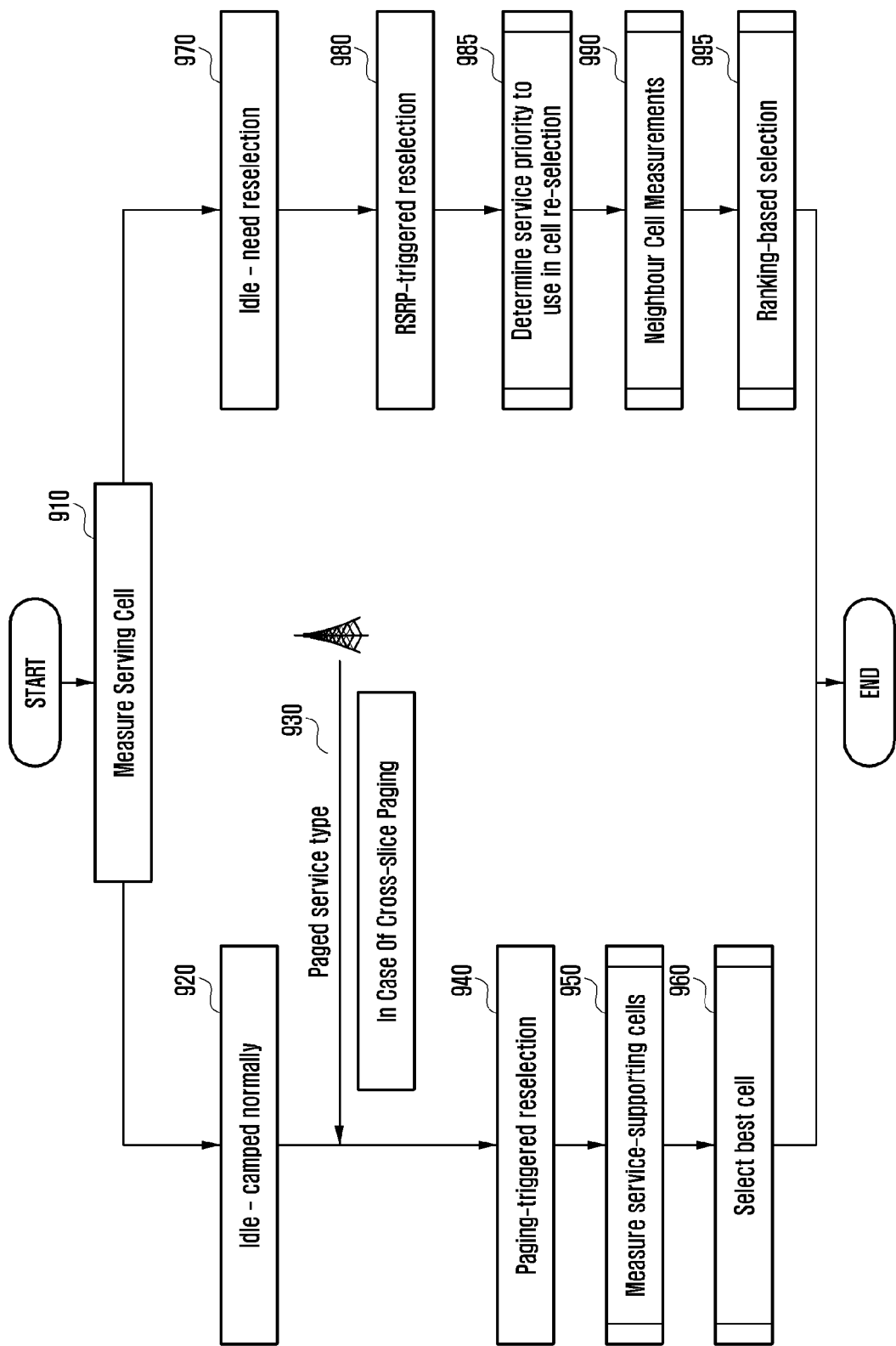
FIG. 9 is a diagram illustrating an example of a cell selection operation of a terminal in a communication system according to an embodiment of the present invention.

FIG. 9 is a diagram illustrating an example of a cell selection operation of a terminal in a communication system according to an embodiment of the present invention.

According to an embodiment of the present invention, the terminal (UE) may perform selecting a cell that supports a service (slice) for paged data.

On a target cell, the UE may receive system information (SI) that contains information on other cells (e.g., neighbor cells of the target cell) and their supported services (e.g., cell ID and slice information).

If the UE receives a paging message and if the paging message indicates that downlink data to be transmitted to the UE is pending, the UE may check and identify whether there is a suitable cell in the cells.

If there is an appropriate cell, the UE may select a cell having the strongest signal strength among the identified cells and receive radio configuration for uplink access.

In addition, the UE may utilize the service information in controlling a rule for measuring the serving cell and neighbor cell for the cell (re)selection.

In this case, the UE may measure only the signal strength of a cell that supports a specific service.

For example, when a measurement reference signal transmitted from one cell is set for each service, the UE may attempt to measure only the RS corresponding to a specific service/slice.

In addition, according to an embodiment, the UE may differently apply, for each service/slice, a threshold value (S-criteria) to be compared with the reference signal strength and used for determining a suitable cell.

In addition, according to an embodiment, the UE (or the base station) may differently use a condition for triggering the cell (re)selection, based on traffic characteristics.

According to an embodiment, the UE may control the cycle, the number of times, etc. of neighbor cell measurements, based on the S-criteria value. For example, if the S-criteria value approaches the threshold value, the number of cells to be measured may be increased.

Meanwhile, the UE may decide which frequencies should be given priority for measurements for cell (re)selection.

The UE may receive information on the other cells and their supported services in the following method. For example, the UE may receive such information through system information (SI) broadcasted from a serving base station, a target base station, or a candidate base station. Alternatively, the UE may receive such information through dedicated signaling information (e.g., RRC signaling) received from the base station. Alternatively, the UE may receive such information through information provided in the RRC connection release message received from the last connected serving cell. And, the UE may receive such information through a combination of the above messages.

The network may send such information to the UE, based on the UE-provided information on the supported slices (services, numerologies) at the UE.

Criteria for the UE to select a slice for performing the cell selection operation, to select the target cells, and to select a cell to perform the access from among the selected target cells have the following examples.

The UE may apply criteria for the UE to select a slice for performing the cell selection operation, to select the target cells, and to select a cell to perform the access from among the selected target cells by considering at least one of RSRP or RSRQ (best cell) of a downlink signal, a cell supporting a slice which the UE desires to transmit/receive first, a cell supporting a corresponding data slice when MO data exists in a UE buffer, a cell supporting a slice of MT transmission data when the base station is paged, paging configuration information and combination thereof (e.g., a cell having the shortest paging cycle), cross-slice paging permission, supportability of a common slice in the base station and the UE, RF capability of the UE, reception of common signaling or dedicated signaling, cell selection based on downlink and/or uplink (DL/UL) coverage, selection based on a difference in RSRP (or RSRQ) between the strongest cell and the target cell, or a switching time of the time division duplex (TDD).

A manner of transmitting such information on the criteria to the UE at the network may be broadcast information (SI, etc.), RRC signaling message, or the like.

In addition, a method for (re)selecting a cell at the UE, based on the indication information may be as follows (UE indication-based selection).

When a common RACH resource is set in UL, the UE may use a common slice for DL control channel reception. Also, according to an embodiment, DL and UL resources for cell (re)selection may be set. In addition, according to an embodiment, the RACH resource may be set differently for each service.

Referring to FIG. 9, at step 910, the UE may measure a serving cell.

Then, as shown at step 920, the UE may be camping on the serving cell. At step 940, the UE may receive a paging message for triggering cell (re)selection. The paging message may contain information on a service requested by the paging message. According to an embodiment, at step 930, the UE may receive the paging message from a base station other than the connected base station. The step 930 may be performed when cross-slice paging is allowed. The cross-slice paging means, for example, that the second base station sends a paging message for a slice of the first base station.

At step 950, the UE may perform a measurement on cells that support the service requested by the paging message. At this time, as described above, the UE may receive, via system information, information on the service (slice) supported by each base station from the base station (a serving base station, a target base station, or a source base station). Then, based on the received information, the UE may identify cells supporting the service requested by the paging message, and perform measurement on the cells.

Then, at step 960, the UE may select the best cell, based on the measurement result.

Meanwhile, as shown at step 970, the UE may be in a state requiring cell reselection. In this case, at step 980, the UE may trigger the cell reselection by RSRP. Then, at step 985, the UE may determine a priority of a service (slice) used for the cell reselection. The UE may perform measurement for neighboring cells at step 990 and select cells having the best measurement result at step 995.

Figure 10:
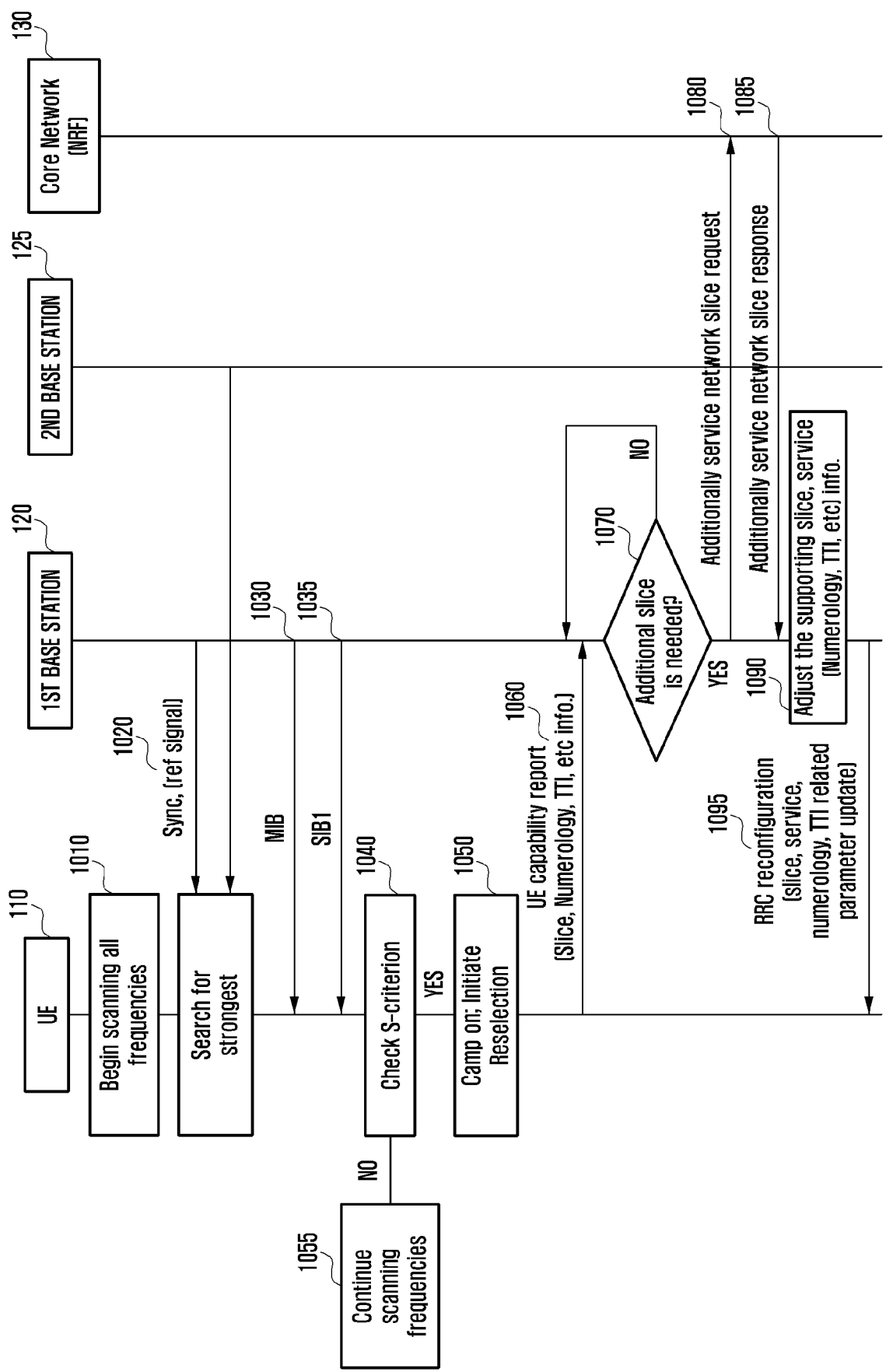
FIG. 10 is a diagram illustrating another example of a cell selection operation of a terminal in a communication system according to an embodiment of the present invention.

FIG. 10 is a diagram illustrating another example of a cell selection operation of a terminal in a communication system according to an embodiment of the present invention.

Referring to FIG. 10, the cell reselection operation of the terminal (UE) 110 based on service information (slice, numerology, TTI, etc.) may include a method for selecting a base station, based on the existing best received signal (e.g., RSRP or RSRQ). For example, in a cell selection method of LTE, the UE may select a cell, based on signal strength (e.g., RSRP, RSRQ).

At step 1010, the UE 110 may begin scanning for all frequencies. At step 1020, at least one of the first base station 120 and the second base station 125 may transmit a reference signal to the UE 110. At this time, the reference signal may be a synchronization (sync.) signal. At step 1025, the UE 110 may search for a reference signal having the largest signal strength. At steps 1030 and 1035, the first base station 120, for example, may transmit system information to the UE 110. For example, the system information may be transmitted to the UE 110 via a master information block (MIB), a system information block (SIB), or the like.

Meanwhile, at step 1035, the first base station 120 may set priority for a frequency band value in a cell (re)selection operation through the system information (SI) (e.g., SIB1) to the UE 110. At step 1040, the UE 110 may determine a suitable cell for (re)selection by performing a measurement on a high-priority frequency band and comparing signal strengths based on metric such as RSRP or RSRQ set by the base station 120. At this time, a ranking-based cell selection may be performed for frequencies having the same priority. That is, at step 1040, the UE 110 may determine whether the RSRP, RSRQ, or the like is greater than a predetermined value for a high-priority frequency band. If so, the UE 110 may camp on a corresponding cell at step 1050 and initiate a cell reselection. If not so, the UE 110 may perform scanning for frequency bands of the next priority at step 1055.

In the method of applying the existing cell selection method of LTE, a priority cell (re)selection may be started based on a received signal such as RSRP or RSRQ for a frequency band having a high priority, and service information may not be applied to cell (re)selection.

After the cell reselection operation, at step 1060, the UE 110 may transmit feedback information containing a UE capability report (indication) procedure to the base station 120 to inform the base station 120 about all services (slices or numerologies, TTIs, or the like) needed to support for the UE. Accordingly, at step 1070, the base station 120 may determine whether an additional slice is required according to a request of the UE. If it is determined that an additional slice is required, the base station 120 may reset the numerology, TTI, etc. with the UE 110 via RRC reconfiguration at step 1095. Alternatively, according to an embodiment, at step 1080, the base station 120 may send a request (e.g., via an additional service network slice request message) to a core network 130 (e.g., a network slice controller, a network repository function (NRF), etc.). At step 1085, the core network 130 may change the service to redirection in order for the reselected base station 120 to support all services to the UE 110 (e.g., via an additional service network slice request message). Also, at step 1090, the base station 120 may be adjusted to support the services for the UE.

In another method, when the UE 120 performs an RRC state transition to an inactive state or an idle state, it is possible to inform the prioritized frequency band via the RRC signaling, based on a service (e.g., RAN slice, numerology, TTI) required by the UE 120.

For such prioritized frequency bands, the UE 110 may use the existing LTE method, as a method for triggering cell reselection, based on the received signal quality such as RSRP or RSRQ. The existing cell selection method of LTE may be advantageous in that a minimum change is required. However, this may cause a delay of redirection for each service in the core network (e.g., network slice controller, network repository function (NRF), etc.). Also, when the UE 110 performs the RRC state transition to the inactive state or the idle state, the method in which the base station informs, via RRC signaling, the UE about the prioritized frequency band mapped to a service (e.g., RAN slice, numerology, TTI) necessary for the UE 110 may have a possibility that information set at the time of entering the inactive or idle state may be changed to another environment at the time of reselection.

Unlike the above-mentioned method of operating based on the existing cell reselection scheme and performing an additional supplementary operation, the base station 120 may directly indicate, to the UE 110, the supported service type through common SI or on-demand SI. In this case, the UE 110 may explicitly recognize the service supported by the corresponding base station 120 and perform reselection of a cell capable of supporting a service (e.g., RAN slice, numerology, TTI, etc.).

Still another method is to extend system information (SI) for each service by transmitting a supporting frequency and related information for existing inter-RAT reselection to the UE 110 by the base station 120. The UE 110 that receives the SI for each service may perform cell reselection by performing a measurement within a corresponding frequency band set (i.e., by measuring a received signal for a set for a limited frequency band). Meanwhile, a terminal operation according to an embodiment of the present invention may include the following. The UE may measure the cell signal strength, determine supported service information of the cell, set the uplink transmission power based on the cell signal strength, and transmit RACH on the corresponding slice. At this time, the cell selection may be based on the maximum or minimum RSRP measurement value. Then, the UE may observe a downlink channel (a time and frequency position thereof) which is set as a common slice.

Figure 11:
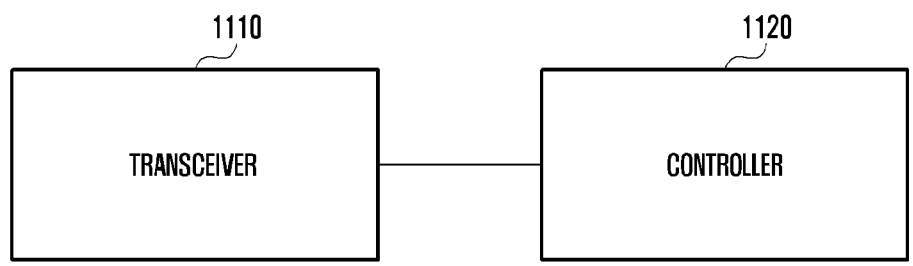
FIG. 11 is a block diagram of a base station according to an embodiment of the present invention.

FIG. 11 is a block diagram of a base station according to an embodiment of the present invention.

Referring to FIG. 11, the base station according to an embodiment of the present invention may include a transceiver 1010 and a controller 1020 for controlling the overall operation of the base station.

The controller 1120 of the base station controls the base station to perform any one operation of the above-described embodiments. For example, the controller 1120 of the base station may transmit information on a service supported by each base station to a terminal via, for example, SI. In addition, the controller 1120 may transmit a reference signal to the terminal according to each cell.

In addition, the transceiver 1110 of the base station may transmit or receive a signal according to any one operation of the above-described embodiments.

Meanwhile, the controller 1120 and the transceiver 1110 are not necessarily implemented as separate modules and may be implemented as one component such as a single chip. The controller 1120 and the transceiver 1110 may be electrically connected.

In addition, the controller 1120 may be, for example, a circuit, an application-specific circuit, or at least one processor. Further, the operations of the base station may be realized by providing a memory device storing corresponding program codes in a certain component within the base station. That is, the controller 1120 may perform the above-described operations through a processor or a central processing unit (CPU) that reads and executes the program codes stored in the memory device.

Figure 12:
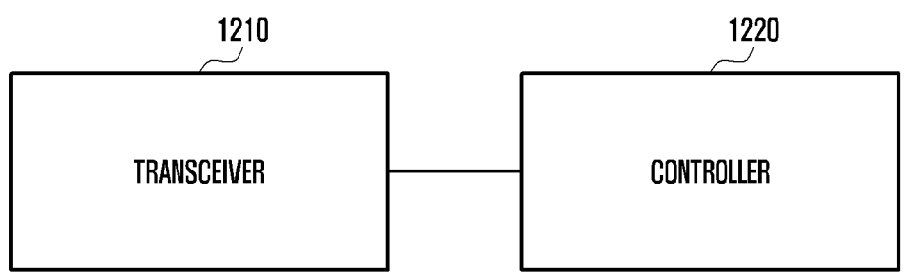
FIG. 12 is a block diagram of a terminal according to an embodiment of the present invention.

FIG. 12 is a block diagram of a terminal according to an embodiment of the present invention.

Referring to FIG. 12, the terminal according to an embodiment of the present invention may include a transceiver 1210 and a controller 1220 for controlling the overall operation of the terminal.

The controller 1220 of the terminal controls the terminal to perform any one operation of the above-described embodiments. For example, the controller 1220 of the terminal may control identifying service information on at least one service supported by the terminal, selecting a first frequency band in which a cell search is to be performed, receiving a reference signal from at least one cell in the selected first frequency band, selecting a first cell, as a target cell, from which the reference signal is received with a largest strength, based on the service information, determining whether the target cell supports the at least one service supported by the terminal, and when the target cell supports the at least one service supported by the terminal, accessing the target cell.

In addition, the transceiver 1210 of the terminal may transmit or receive a signal according to any one operation of the above-described embodiments.

Meanwhile, the controller 1220 and the transceiver 1210 are not necessarily implemented as separate modules and may be implemented as one component such as a single chip. The controller 1220 and the transceiver 1210 may be electrically connected.

In addition, the controller 1220 may be, for example, a circuit, an application-specific circuit, or at least one processor. Further, the operations of the terminal may be realized by providing a memory device storing corresponding program codes in a certain component within the terminal. That is, the controller 1220 may perform the above-described operations through a processor or a central processing unit (CPU) that reads and executes the program codes stored in the memory device.

Embodiments disclosed in the present specification and drawings are only illustrative of specific examples in order to facilitate description and understanding of the technical contents, and are not intended to limit the scope of the present invention. It is to be understood by those skilled in the art that other modifications based on the technical idea of the present invention are possible in addition to the embodiments disclosed herein.

While this disclosure contains many specific implementation details, these should not be construed as limitations on the scope of the invention or of what may be claimed, but rather as descriptions of features that may be specific to particular embodiments of particular invention.

The invention claimed is:

1. A method performed by a terminal in a wireless communication system, the method comprising:
    receiving first system information from a serving cell, wherein the first system information includes information on maximum number of cell searching and information on timer of the cell searching;
    identifying service information on at least one service supported by the terminal;
    selecting a first frequency band for the cell searching based on the information on the maximum number of the cell searching or the information on the timer of the cell searching;
    receiving a reference signal from at least one cell in the selected first frequency band;
    selecting a first cell having a largest strength of the reference signal as a target cell;
    receiving second system information from the target cell;
    determining whether the target cell supports the at least one service supported by the terminal based on the service information and the second system information; and
    accessing the target cell, based on the target cell supporting the at least one service supported by the terminal,
    wherein a form of the service information is bitmap form or bit-indication form, and
    wherein the service information is identified based on at least one of a high-priority service type designated by subscription information of the terminal, a service type expected to consume the minimum power for cell selection operation or paging, a service type of information to be transmitted on uplink by the terminal, a service type of information to be received on downlink by the terminal, or a service type of information most frequently transmitted or received by the terminal for a given time.

2. The method of claim 1, further comprising:
    selecting a second cell having a larger signal strength after the first cell as the target cell, based on the target cell not supporting the at least one service supported by the terminal.

3. The method of claim 1, further comprising:
    selecting a second frequency band in which the cell searching is to be performed, based on the target cell not supporting the at least one service supported by the terminal.

4. The method of claim 1, wherein the second system information include information on a service supported by the target cell.

5. The method of claim 1, wherein the target cell includes at least one of a cell having a received strength of the reference signal greater than a predetermined first threshold value, a cell having a difference between a received strength of the reference signal and a received strength of a reference signal of the first cell, the difference being smaller than a predetermined second threshold value, a cell supporting at least one service supported by the terminal, or a cell set as a target base station by a base station.

6. The method of claim 1, wherein receiving a reference signal from at least one cell includes:
    selecting a slice in which the cell searching is to be performed; and
    receiving a reference signal from the at least one cell in the slice.

7. The method of claim 6, wherein the slice is a common slice supporting a plurality of services or a dedicated slice supporting a specific service.

8. A terminal in a wireless communication system, the terminal comprising:
    a transceiver; and
    a processor configured to:
        receive, from a serving cell via the transceiver, first system information, wherein the first system information includes information on maximum number of cell searching and information on timer of the cell searching,
        identify service information on at least one service supported by the terminal,
        select a first frequency band for the cell searching based on the information on the maximum number of the cell searching or the information on the timer of the cell searching,
        receive, from at least one cell in the selected first frequency band via the transceiver, a reference signal,
        select a first cell having a largest strength of the reference signal as a target cell,
        receive, from the target cell via the transceiver, second system information, determine whether the target cell supports the at least one service supported by the terminal based on the service information and the second system information, and access the target cell, based on the target cell supporting the at least one service supported by the terminal, wherein a form of the service information is bitmap form or bit-indication form, and wherein the service information is identified based on at least one of a high-priority service type designated by subscription information of the terminal, a service type expected to consume the minimum power for cell selection operation or paging, a service type of information to be transmitted on uplink by the terminal, a service type of information to be received on downlink by the terminal, or a service type of information most frequently transmitted or received by the terminal for a given time.

9. The terminal of claim 8, wherein the processor is further configured to select a second cell having a larger signal strength after the first cell as the target cell, based on the target cell not supporting the at least one service supported by the terminal.

10. The terminal of claim 8, wherein the processor is further configured to select a second frequency band in which the cell searching is to be performed, based on the target cell not supporting the at least one service supported by the terminal.

11. The terminal of claim 8, wherein the second system information include information on a service supported by the target cell.

12. The terminal of claim 8, wherein the target cell includes at least one of a cell having a received strength of the reference signal greater than a predetermined first threshold value, a cell having a difference between a received strength of the reference signal and a received strength of a reference signal of the first cell, the difference being smaller than a predetermined second threshold value, a cell supporting at least one service supported by the terminal, or a cell set as a target base station by a base station.

13. The terminal of claim 8, wherein the processor is further configured to select a slice in which the cell searching is to be performed, and to receive, from the at least one cell in the slice via the transceiver, a reference signal.

14. The terminal of claim 13, wherein the slice is a common slice supporting a plurality of services or a dedicated slice supporting a specific service.

* * * * *